May 22, 1934.  W. F. HENDERSON ET AL  1,959,980
COLORED SHEET MATERIAL AND METHOD OF PRODUCING IT
Filed Nov. 30, 1931
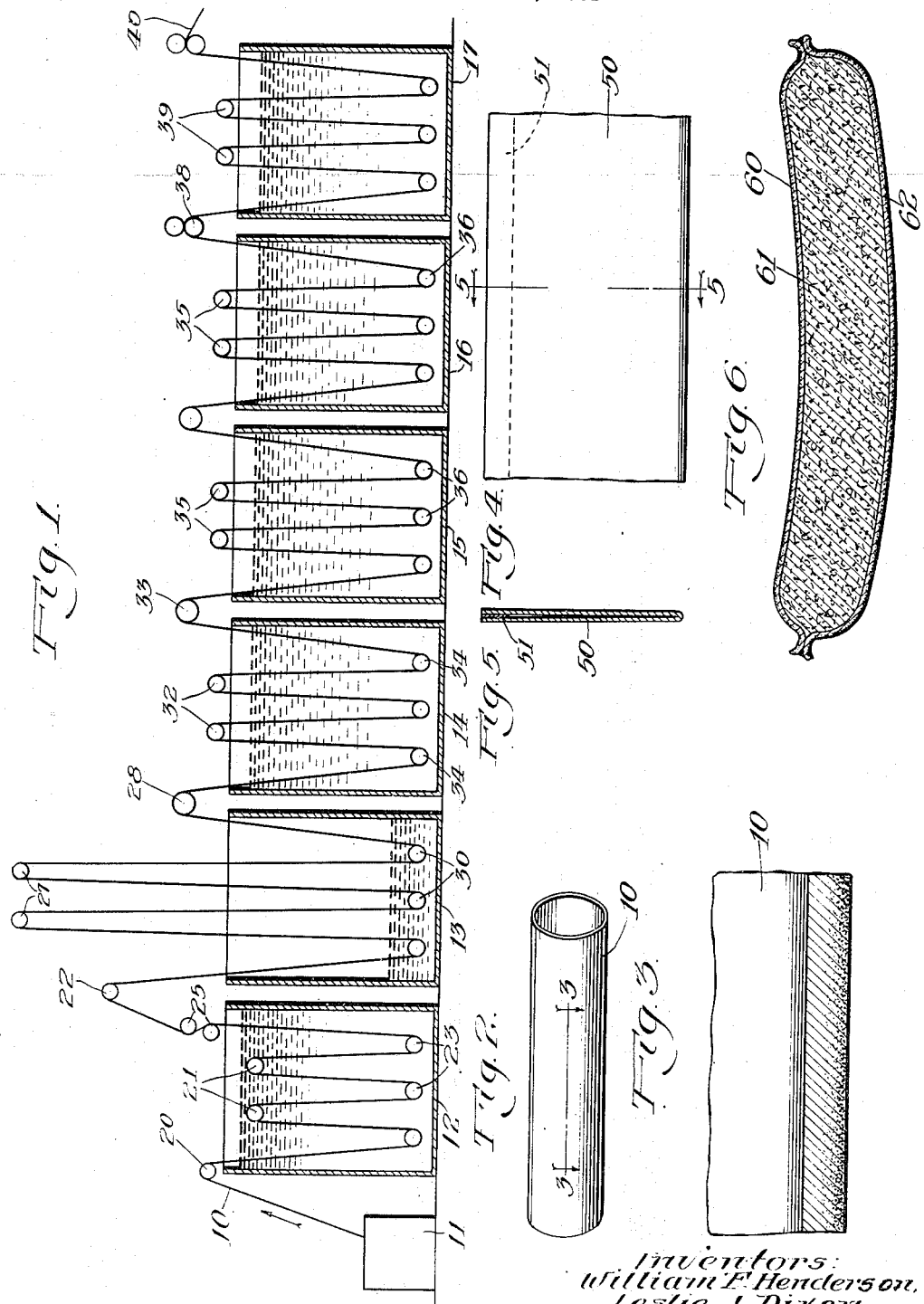

Patented May 22, 1934

1,959,980

UNITED STATES PATENT OFFICE 1,959,980

COLORED SHEET MATERIAL AND METHOD OF PRODUCING IT

William F. Henderson and Leslie J. Dixon, Chicago, Ill., assignors to The Visking Corporation, a corporation of Virginia Application November 30, 1931, Serial No. 578,156

6 Claims. (Cl. 99—11)

The invention relates broadly to dyed or colored sheets or films and a method of producing them, it being the primary object of the invention to provide films of regenerated cellulose or cellulose derivatives which are dyed or colored only on one side thereof so that they are particularly adapted to be employed as covers, etc., for food-stuffs.

Thus, it is frequently desirable to package food-stuffs in sheets or tubes of regenerated cellulose or cellulose derivatives but inasmuch as the film comes in contact with the food-stuffs and since it is difficult to dye the film with the permitted food colors, there are certain limitations to the use of dyed or colored films of cellulose etc., and particularly so when the packaging process involves wetting or cooking as it does in some instances in the meat packing industry.

Films or tubes of regenerated cellulose or cellulose derivatives, which embody the invention and are dyed or colored only on one side thereof are particularly adapted to be employed as covers for food-stuffs, the dyed or colored surface being kept out of contact with the food-stuffs and the dyes employed being preferably such that they are not affected by moisture, or by cooking or smoking operations.

Except as indicated in the appended claims, the invention is not limited to use in connection with food-stuffs, or to the use of any particular dyes, as it is contemplated that the improved method may be practiced to produce films of the character described which are colored for ornamental purposes. Thus, it is contemplated that films may be produced which are dyed one color on one side and another color on the other side.

Other objects will become apparent as the following detailed description progresses, reference being had to the accompanying drawing, wherein:

Figure 1 is a somewhat diagrammatic view of apparatus whereby the improved method may be practiced.

Fig. 2 is a perspective view of a piece of seamless cellulose tubing adapted to be employed as a sausage casing, the tubing being dyed solely on its outer side.

Fig. 3 is an enlarged section taken on line 3—3 of Fig. 2 and illustrates the manner in which the dye is incorporated in the structure of the film or wall of the tubing.

Fig. 4 is a fragmentary elevation of a sheet of regenerated cellulose which embodies another form of the invention, Fig. 5 is a section taken on line 5—5 of Fig. 4, and Fig. 6 is a longitudinal section through a sausage which embodies the invention.

In Figure 1, apparatus for dyeing seamless cellulose tubing is illustrated diagrammatically. This tubing is employed as casings for sausage, etc., in the meat packing industry and is formed from viscose which is extruded through an annular orifice into a regenerating bath. The apparatus shown in Fig. 1 is adapted to dye the outer side of the tubing in such manner that the dye does not penetrate through the wall thereof. Therefore, when the tubing is stuffed with the sausage meat, the dye, which is not affected by cooking or smoking, does not come into contact with the sausage meat and no objection can be made to the use of the dye as the meat is not contaminated thereby.

The seamless cellulose tubing, a piece of which is shown at 10 in Fig. 2, is advanced in a collapsed condition through the apparatus shown in Fig. 1. The tubing may be fed to the apparatus shown in Fig. 1 directly from the apparatus (not shown) which produces the tubing so that the tubing is manufactured and dyed continuously. Fig. 1 illustrates the tubing 10 being withdrawn from a sliver can 11 and then advanced continuously through a series of vats or receptacles which hold the baths to which the tubing is subjected during the dyeing operation. It is understood, of course, that the ingredients of the baths cannot come into direct contact with the inner-side of the tubing and that liquids may penetrate into the structure of the film.

The tubing 10 is advanced from the sliver can 11 through a series of receptacles 12, 13, 14, 15, 16 and 17. The receptacle 12 holds the bath for dyeing the tubing. The receptacle 13 holds the water for rinsing the tubing as it leaves the bath or receptacle 12. The vat 14 holds a dilute acid bath. The vats 15 and 16 hold water for washing the tubing and the vat 17 holds a bath which contains an ingredient which insures that the tubing will remain in a soft and pliable condition. Among the substances that may be employed in the vat 17 are dilute glycerine, glycol, glycol derivatives, sorbitol, or other suitable hydroscopic agents. If glycerine is used, a bath having a specific gravity of 1.010 to 1.035 at 25° C. may be employed. After the tubing passes from the vat 17 it is dried by the method customarily employed in the industry.

As stated above, the tubing may be fed directly to the dye bath from the apparatus which produces the tubing. When this method is practiced, the tubing is thoroughly wet with water when it enters the dye bath. If dry tubing is to be dyed, it must be thoroughly wet with water before it is advanced into the dye bath.

The dyes preferably employed in practicing the present invention are those belonging to the vat series or indanthrene dyes, but the invention is limited to the use of these dyes only to the extent indicated in the appended claims as it is contemplated that any dyestuff or coloring material which can be made to conduct itself in a manner similar to the vat series may be employed.

With the vat dyes, the dye-stuff is applied in a reduced form, called the leuco-form, which is soluble in water in the presence of dilute alkali and a reducing agent.

The reducing agent preferably employed is dilute sodium hydrosulfite ($Na_2S_2O_4$). Other reducing agents which might be employed are fermentation, copperas, and alkaline zinc dust. However, the universality and great advantages of sodium hydro-sulfite over all of the other applicable reducing agents for vat dyes makes it the only one necessary to consider in the practice of the improved method.

The dilute alkali is preferably sodium hydroxide although potassium hydroxide or any other suitable caustic alkali may be employed if it is so desired.

It is contemplated that any of the vat dyes may be employed in practicing the method, the specific dye employed depending upon the coloring desired. The following classification includes practically all of the vat dyes:

I. Indigoid vat dyes.
II. Anthracene or anthraquinone vat dyes.
   (A) Indanthrone group
   (B) Flavanthrone group
   (C) Benzanthrone group
      etc.
III. Sulfide vat dyes.

A specific example of a dye bath suitable for use in the dyeing of regenerated cellulose or cellulose derivatives is composed as follows:

|  | Parts |
|---|---|
| Sodium hydroxide | 4–7 |
| Sodium hydrosulfite | 1–7 |
| Indanthrene orange G. No. 1096 | 1–5 |
| Water | 1,000 |

This bath is maintained at a temperature between 50° and 60° C. during the dyeing operations.

If indanthrene orange R. (No. 1097) is employed, the same range of composition may be employed and the dye bath may be used at room temperature.

The tubing 10 is advanced through a receptacle or vat 12 by driven rollers 20, 21, and 22, the tubing being trained over idler rollers or glass rods 23 disposed beneath the surface of the dye bath. A pair of wiping rods 25 remove excess dye liquid from the tubing as it passes from the dye bath.

The dye penetrates to a predetermined depth into the wall of the tubing. This is made possible by controlling the temperature, concentration and time elements so that the dye penetrates only to the desired depth. For a film which is .002 inch in thickness when dry (usually .012 inch when wet) an exposure of not over 10 minutes and preferably not over 2–3 minutes is sufficient.

After the tubing 10 has been subjected to the dyeing operation, it is advanced through the vat 13 by the driven roller 22 and by driven rollers 27 and 28. It will be noted that the driven rollers 22 and 27 are positioned high above the vat 13 and that they are adapted to draw the tubing around idler rollers or glass rods 30 disposed beneath the surface of the water in the vat 13. The purpose of arranging the rollers 22 and 27 high above the vat 13 is to subject the dye to oxidation. The period of oxidation is generally from 10 to 20 minutes. After it has been oxidized, the dye is in its insoluble form. If it is so desired, other means of oxidation may be employed such as, for example, 0.1% hydrogen peroxide, sodium persulfate, etc.

After the dye has been oxidized it cannot be washed out of the film, because it is not only insoluble in water as stated above, but it is firmly attached to the cellulose structure by adsorption. A microscopical examination of a cross-section of such a film shows clearly that the color resides in the film structure and not merely on the surface. In Fig. 3 the penetration of the dye, is indicated by stippling.

When the tubing leaves vat 13, it is advanced by the driven roller 28 and driven rollers 32 and 33 through the vat 14. The tubing is trained over idler rollers or glass rods 34 positioned beneath the surface of the dilute acid bath contained in the vat 14. The dilute acid bath may consist of 1–5% acetic acid or 0.5%–1% sulphuric acid. This will completely neutralize any residual caustic soda in the film, and subsequent washing in water removes all by-products from the film.

Driven rollers 35 advance the tubing through the vats 15 and 16, the tubing being trained over idler rollers or glass rods 36 disposed beneath the surface of the wash water contained in these vats. The water in the vats 15 and 16 may be of any suitable temperature and, if so desired, the temperature of the water in one bath may be higher than the temperature of the water in the other vat.

After the tubing has been washed in the vats 15 and 16, it is advanced by driven rollers 38, 39 and 40 through the vat 17 as described above.

In Figures 4 and 5, a sheet 50 of regenerated cellulose is shown. The sheet is folded longitudinally thereof and the longitudinal edges of the sheet are cemented to each other as shown at 51. Obviously, the folded sheet 50 may be advanced through the apparatus shown in Fig. 1 to dye one surface thereof. After the sheet has been dyed, the cemented portion may be cut away. If it is desired to color the other side of the sheet, it may be folded with the dyed side turned in and its longitudinal edges may be cemented in the manner illustrated in Figures 4 and 5. The sheet may be advanced again through the apparatus shown in Fig. 1 to dye the other side thereof with a different color. The dyes described above may be employed if it is so desired, but if the sheet is not to be used for the packaging of food, any other suitable dye may be employed even though it does not become insoluble.

It will be readily understood that the improved method is not limited to use in connection with the apparatus shown in Fig. 1 as all of the operations may be performed manually. It will be also understood that the dye need not be applied uniformly over the regenerated cellulose and that patterns or ornamental effects may be obtained if it is so desired.

Figure 6 shows a sausage 60 which comprises sausage meat 61 enclosed within the sausage casing 62 formed from regenerated cellulose. The outer side of the sausage casing 62 has been dyed with a dye of the vat series in such manner that the dye has penetrated only part of the way through the wall of the casing. The dye is shown by stippling in the drawing and the thickness of the casing is exaggerated to illustrate the manner in which the dye penetrates part of the way through the wall.

Of course, the casing 62 is carefully dyed to give it a color resembling the color of natural sausage casing or, rather, to give the sausage the appearance of a sausage provided with a natural sausage casing.

It will be noted that the dye does not come into contact with the meat 61 and it will be readily understood that the sausage may be smoked or cooked without causing the meat 61 to be affected in any manner by the dye.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as possible, in view of the prior art.

We claim:

1. The combination with a foodstuff, of a covering therefor comprising a film of regenerated cellulose, said regenerated cellulose being dyed on its outer side, said dye penetrating only part way through said film.

2. The combination with a foodstuff, of a covering therefor comprising a film of regenerated cellulose, said regenerated cellulose being dyed on its outer side with a dye insoluble in water and resistant to smoking operations, said dye penetrating only part way through said film.

3. The combination with a foodstuff, of a covering therefor comprising a film of regenerated cellulose, said regenerated cellulose being dyed on its outer side with an oxidized vat dye, said dye penetrating only part way through said film.

4. As an article of commerce, meat cooked in a covering of regenerated cellulose, said covering being dyed on its outer side with a dye insoluble in water, said dye penetrating only part way through said film.

5. A covered meat product prepared by cooking in the covering comprising, in combination: a body of cooked meat foodstuff, a covering thereon comprising a film of regenerated cellulose, said film impregnated adjacent one surface thereof with a dye of such a nature as to be resistant to the cooking operation, the surface of said film which is in contact with said body being free from dye.

6. A covered, cooked and smoked meat product comprising, in combination: a body of meat foodstuff, a covering thereon comprising a film of regenerated cellulose, said film impregnated at and adjacent to one surface with a dye resistant to the cooking and smoking treatments, the surface of said film in contact with said body being free from said dye.

WILLIAM F. HENDERSON.
LESLIE J. DIXON.